United States Patent [19]

Clendening

[11] Patent Number: 5,717,796
[45] Date of Patent: Feb. 10, 1998

[54] OPTICAL FIBER TRANSMISSION SYSTEM UTILIZING A LINE SWITCHED RING TO PROVIDE PROTECTION

[75] Inventor: Steven Clendening, Kawasaki, Japan

[73] Assignee: Fujitsu Limited, Kanagawa, Japan

[21] Appl. No.: 819,023

[22] Filed: Mar. 17, 1997

Related U.S. Application Data

[63] Continuation of Ser. No. 423,782, Apr. 18, 1995, abandoned.

[30] Foreign Application Priority Data

Jun. 30, 1994 [JP] Japan ..................... 6-149734

[51] Int. Cl.⁶ .................... G02B 6/28; H04J 1/16
[52] U.S. Cl. .................... 385/24; 370/222; 370/223; 370/224; 359/119
[58] Field of Search ................ 385/24, 26, 15; 370/222–224; 371/8.2; 359/110, 113, 118, 119, 128; 340/825.05

[56] References Cited

U.S. PATENT DOCUMENTS

| | | | |
|---|---|---|---|
| 4,704,713 | 11/1987 | Haller et al. | 359/119 |
| 5,179,548 | 1/1993 | Sandesara | 370/222 |
| 5,216,666 | 6/1993 | Stalick | 370/222 |
| 5,315,674 | 5/1994 | Asako | 385/15 |
| 5,440,540 | 8/1995 | Kremer | 370/223 |
| 5,442,620 | 8/1995 | Kremer | 370/224 |
| 5,442,623 | 8/1995 | Wu | 370/224 |
| 5,491,572 | 2/1996 | Ohara | 359/110 |

*Primary Examiner*—Rodney B. Bovernick
*Assistant Examiner*—Hemang Sanghavi
*Attorney, Agent, or Firm*—Helfgott & Karas P.C.

[57] ABSTRACT

Protection is provided by switching an optical transmission signal. An optical transmission system operating in a ring configuration, comprises optical transmitters and optical receivers connected in such a way as to provide working and protection on paths. When a failure occurs that disrupts the signal between two telecommunication nodal sites, optical switches are used to switch the signals from a working path to a protection path away from the disruption.

5 Claims, 7 Drawing Sheets

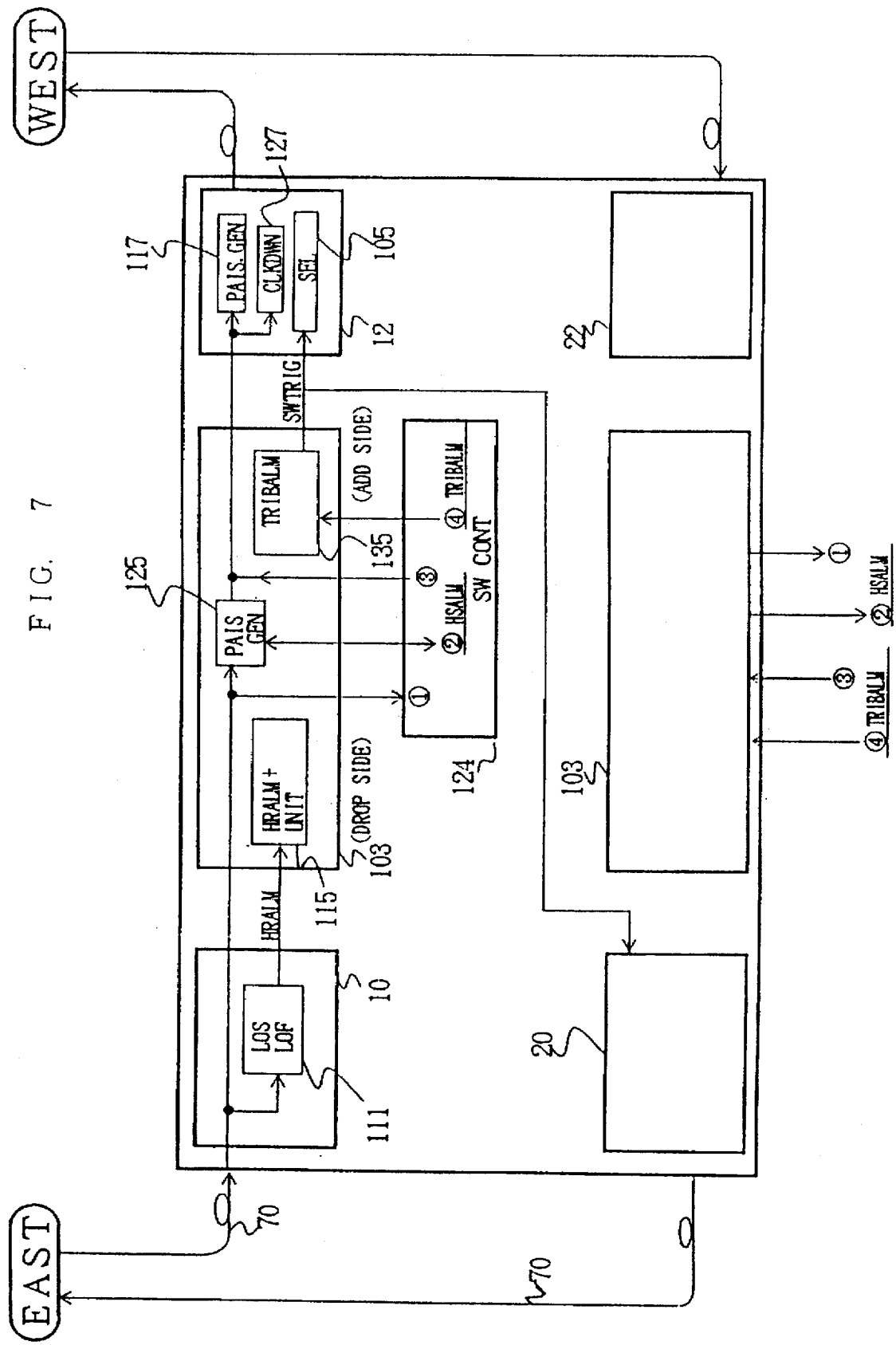

OPTICAL FIBER TRANSMISSION SYSTEM UTILIZING A LINE SWITCHED RING TO PROVIDE PROTECTION

This is a continuation of application Ser. No. 08/423,782, filed Apr. 18, 1995 now abandoned.

BACKGROUND OF THE INVENTION

1. Field of the Invention

The present invention relates to an optical fiber transmission system utilizing a line switched ring to provide protection of the system in case of failure. More particularly, it relates to an optical fiber transmission system utilizing an optical switching method to protect rings.

2. Description of the Related Art

In optical fiber transmission systems, bandwidth is allocated to a system to provide protection thereof during failures that are likely to occur during operation.

Thus, the total bandwidth of a system is divided into two parts, working and protection and the actual traffic signals travel over the working or protection bandwidth depending on the status of system.

In an optical transmission system which comprises a plurality of optical fiber network devices connected by optical fiber transmission paths into a ring configuration, ring protection methods have been defined to protect not only against equipment failures but also to protect against facility and nodal failure.

Currently, optical fiber communications use electrical switching methods for transferring the working bandwidth to the protection bandwidth. The working signals are sent through electronic switches or selectors that are able to route the traffic over the working or protection bandwidth.

At lower speeds of transmission the low speed signals are sent directly through the electronic switching circuitry when routing the traffic.

But as transmission speed increases and transmission systems grow in physical area, directly switching the signal electronically is not so trivial.

Therefore, high speed optical transmission systems need different methods of routing the bandwidth.

SUMMARY OF THE INVENTION

Accordingly, an object of the present invention is to provide an optical fiber transmission system, in which the traffic is effectively transferred from the working bandwidth to the protection bandwidth by utilizing an optical switching method instead of electrical methods.

It is another object of the present invention to provide an optical fiber transmission system having a means for simple routing of the optical signal itself from the working to protection bandwidth, thus eliminating a portion of the more difficult electronic switching.

It is a further object of the present invention to provide an optical fiber transmission system operated with rings which have optical receivers and optical transmitters connected to the working and protection optical fiber transmission paths making the switching possible to the protection side by switching optical transmission signals.

It is a more specific object of the present invention to provide an optical fiber transmission system, which can prevent the failure state of signals by switching the optical switch from a working communication path to a protection communication path by employing optical switches in the case where a failure occurs and the signal transmission between two communication sites is disconnected.

The above object and features of the present invention will be more apparent from the following description of the preferred embodiments with reference to the drawings.

BRIEF DESCRIPTION OF THE DRAWINGS

FIG. 7 is a diagram for explaining alarm signal generation when optical receivers and optical transmitters detect failures.

DESCRIPTION OF THE PREFERRED EMBODIMENTS

For better understanding of the present invention, features of the present invention will be explained with reference to the drawings showing a line switched ring system utilizing four optical fiber transmission paths, which comprise a bi-directional working pair and a bi-directional protection pair, before explaining embodiments according to the present invention.

Figure 1:
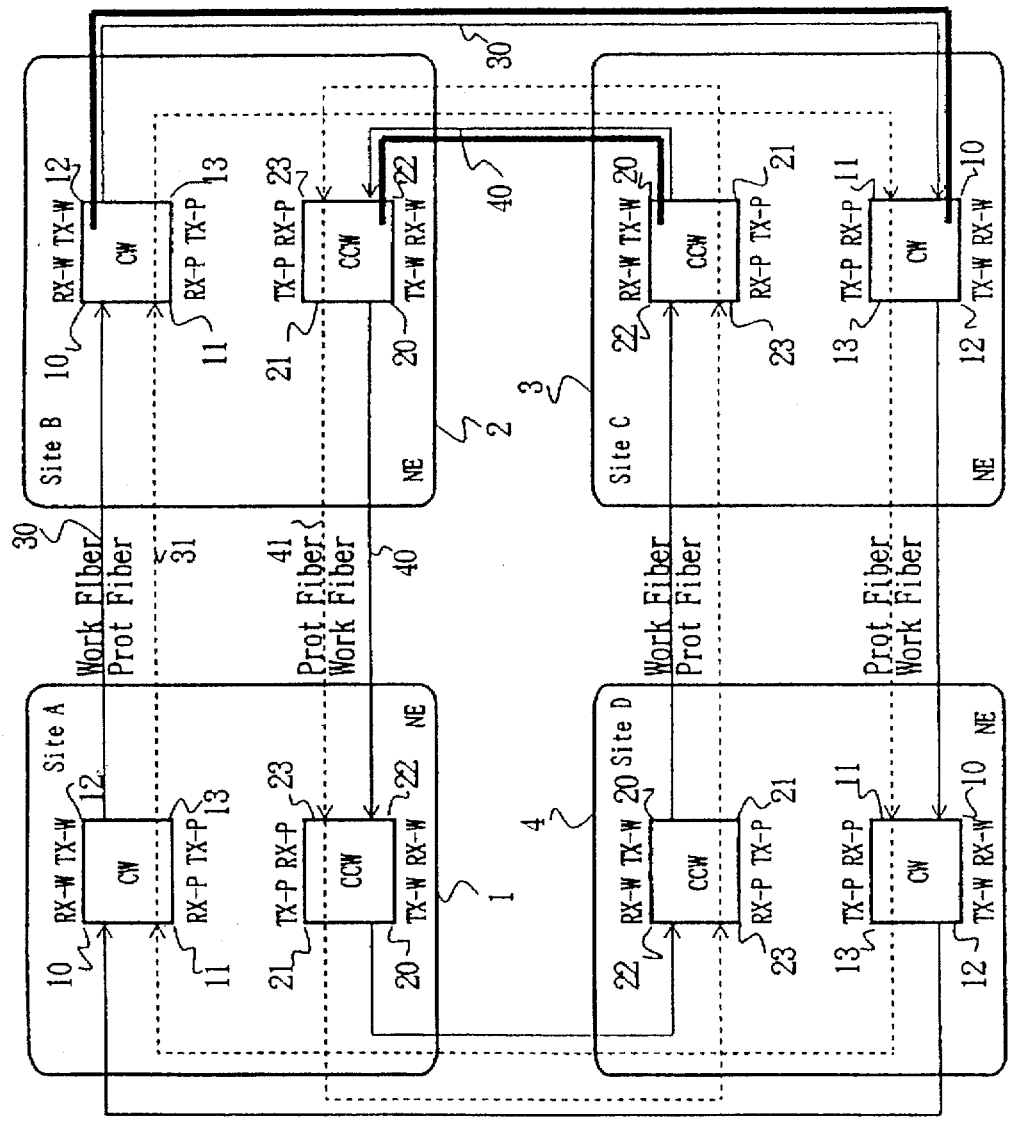
FIG. 1 is a block diagram of a four-site, line-switched ring in a normal, inactive state.

For simplicity, FIG. 1 shows a block diagram of a line switched ring system having four optical fiber transmission paths, which are switched over at each of four nodal sites. This ring system is in a normal, inactive state.

In the diagram, four nodal sites A, B, C and D have been arbitrarily drawn. Reference numerals 1 to 4 denote optical fiber network equipments (NE) on the four nodal sites A, B, C and D.

In FIG. 1, for simplicity, four nodal sites are connected in a ring configuration with optical fibers 30 and 40 which form a working pair and optical fibers 31 and 41 which form a protection pair. However, the ring configuration could have any number of nodal sites, to which a plurality of the optical fiber network equipments (NE) are connected.

SONET (Synchronous Optical NETwork) is well known in North America as an example of an optical fiber network utilizing four fibers (30, 31, 40, 41) which form a bi-directional working pair and a hi-directional protection pair.

SONET is an optical network for synchronizing an optical signal having the speed of 45M bits of third-order group on digital hierachies.

In FIG. 1, each optical fiber network equipment (NE), 1 to 4, has optical receivers (RX) 10 and 11 connected to a working optical fiber 30 and a protection optical fiber 31 going toward one direction, i.e., clockwise direction (CW). Similarly, each optical fiber network equipment (NE), 1 to 4, has optical receivers (RX) 22 and 23 connected to a working optical fiber 40 and a protection optical fiber 41 going toward the another direction, i.e., counterclockwise (CCW).

Further, each optical fiber network equipment (NE), 1 to 4, has optical transmitters (TX) 12 and 13 connected to the working optical fiber 30 and the protection optical fiber 31 going toward one direction, i.e., clockwise direction (CW). Similarly, each optical fiber network equipment (NE), 1 to 4, has optical transmitters (TX) 20 and 21 connected to the working optical fiber 40 and the protection optical fiber 41 going toward the another direction, i.e., counterclockwise (CCW).

A normal state will be considered in which an optical signal, that is, traffic is transmitted and received between the optical fiber network equipment (NE) 2 at the nodal site B and the optical fiber network equipment (NE) 3 at the nodal site C.

The traffic output from the optical transmitter 12 of the optical fiber network equipment (NE) 2 is input to the clockwise optical receiver 10 of the optical fiber network equipment (NE) 3, via the working optical fiber 30 in the clockwise direction.

Similarly, the traffic from the optical transmitter 20 of the optical fiber network equipment (NE) 3 is input to the counter-clockwise optical receiver 22 of the optical fiber network equipment 2, via the working optical fiber 40 in the counter-clockwise direction.

In the diagram, bold lines parallel to the working optical fibers 30 and 40 show one bi-directional traffic signal as explained above.

In this way, the optical fiber transmission system which is an object of the present invention forms bi-directional communication lines by connecting the optical fiber network equipments (NE) 1 to 4 with a pair of working and protection optical fiber rings in clockwise and counterclockwise directions.

As an example of ring protection switching, the failure case where a disconnection between the optical fiber network equipment (NE) 2 and the optical fiber network equipment (NE) 3 in the above-described structure will be considered here.

Figure 2:
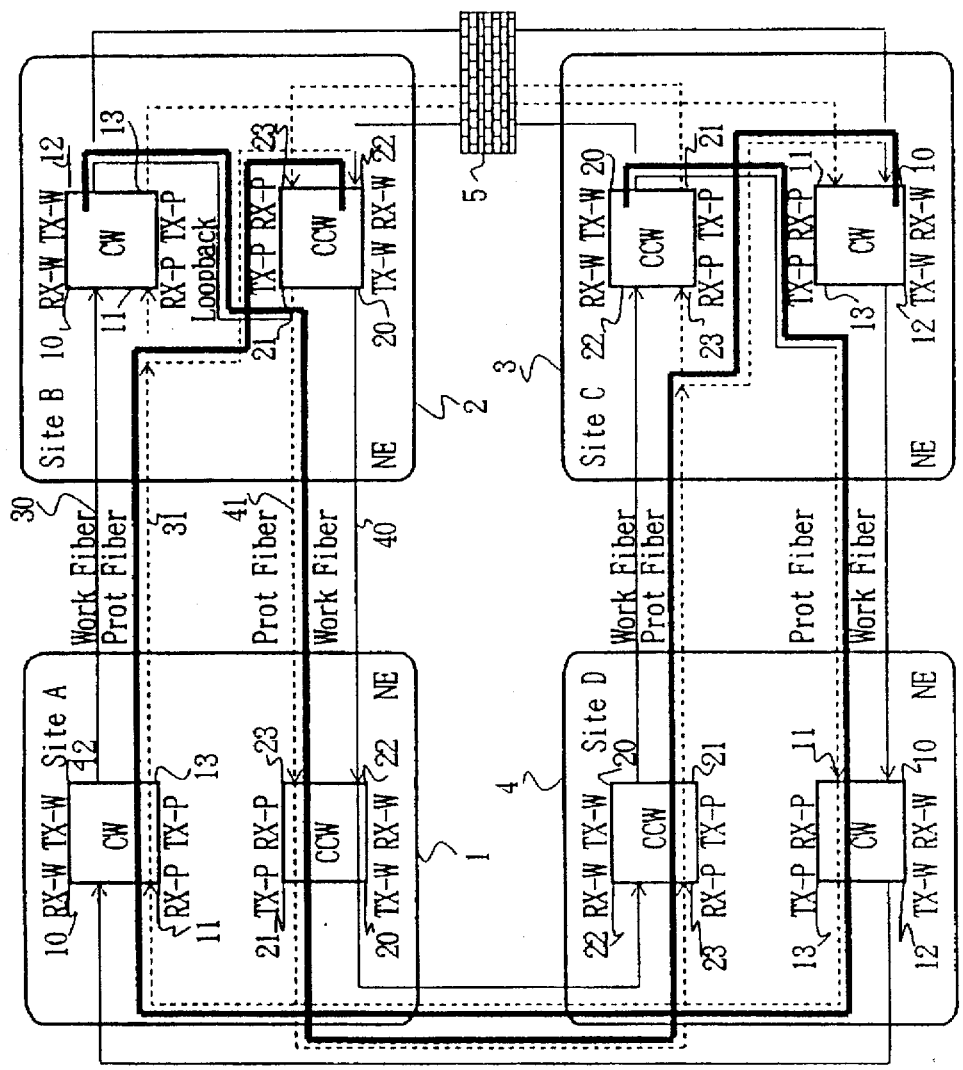
FIG. 2 is a block diagram of a four-site, line-switched ring in a failed, active state.

FIG. 2 shows a block diagram of a four-site, line-switching ring system the same as FIG. 1. This ring system is in a failed, active state.

Namely, FIG. 2 shows an abnormal state in which the traffic could not be transmitted via any of working or protection optical fibers 30, 31 and 40, 41 between the optical fiber network equipment (NE) 2 and the optical fiber network equipment (NE) 3 due to failure 5.

In this case, the traffic must be re-routed to provide survivability of services for the end user. Accordingly, as shown in the drawing, the traffic is looped-back away from the failure to the protection optical fiber for transmitting the optical signal in the opposite direction.

That is, the traffic from the clockwise optical transmitter 12 of the optical fiber network equipment (NE) 2 is looped back, and is input to the optical fiber network equipment (NE) 3 via the optical fiber network equipments (NE) 1 and 4 through the counter-clockwise protection optical fiber 41.

The optical fiber network equipment (NE) 3 branches the counter-clockwise protection optical fiber 41 on the input side of the counter-clockwise optical receiver 23, and connects to the input side of the clockwise optical receiver 10.

Accordingly, it is possible to transmit the traffic in a counter-clockwise direction from the optical fiber network equipment (NE) 2 to the optical fiber network equipment (NE) 3.

Meanwhile, the traffic from the counter-clockwise optical transmitter 20 of the optical fiber network equipment (NE) 3 is loop-backed, and is input to the optical fiber network equipment (NE) 2 via the optical fiber network equipments (NE) 4 and 1, through the clockwise protection optical fiber 31.

The optical fiber network equipment (NE) 2 branches the clockwise protection optical fiber 31 on the input side of the clockwise optical receiver 11, and connects to the input side of the counter-clockwise optical receiver 22.

Accordingly, the ring protection switching is realized by transmitting the traffic from the optical fiber network equipment (NE) 3 to the optical fiber network equipment (NE) 2 in the clockwise direction.

In this respect, the completion of the re-routed bi-directional path ensures that service is still in operation.

In FIGS. 1 and 2, the method for looping-back the signals to re-route the traffic was ignored for the sake of simplicity.

Figure 3:
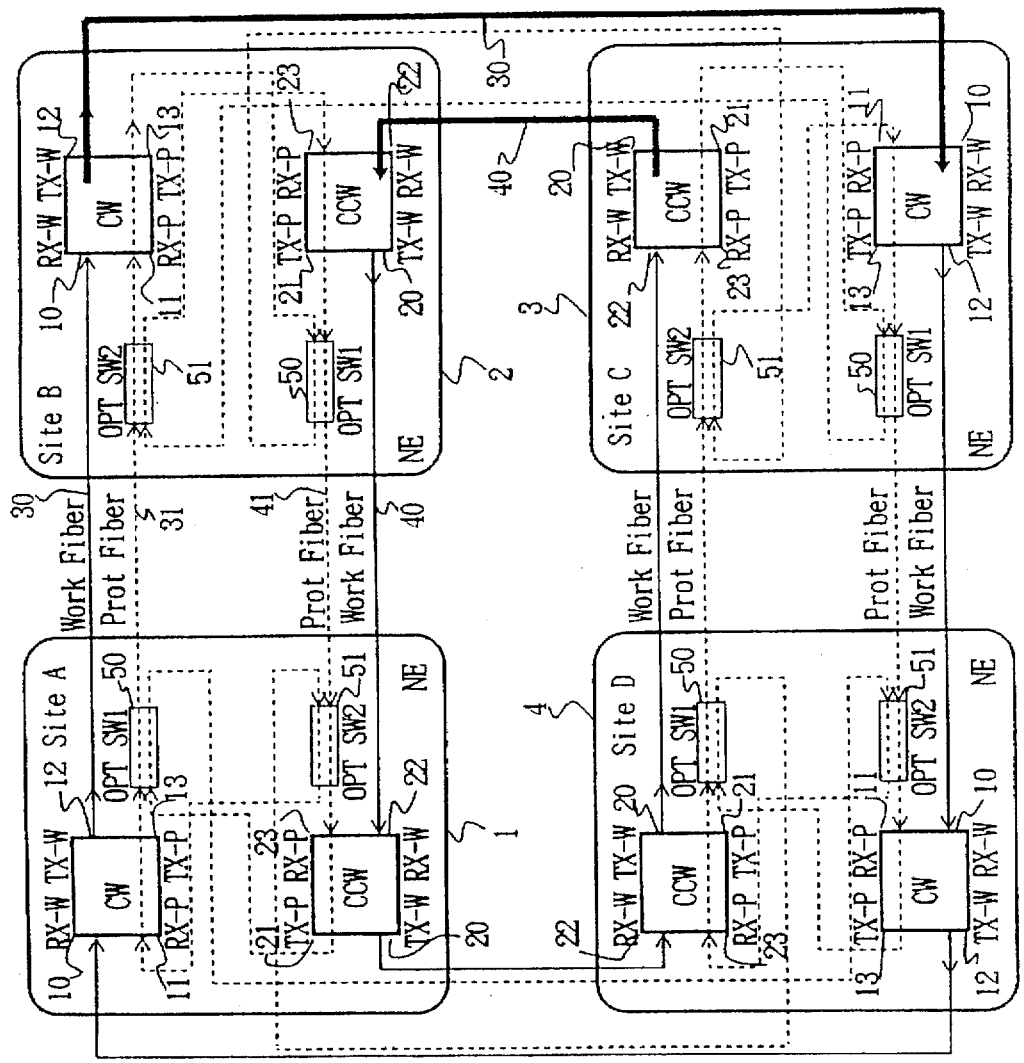
FIG. 3 is a block diagram of a four-site, line-switched ring using optical switches in a normal, inactive switched state.
Figure 4:
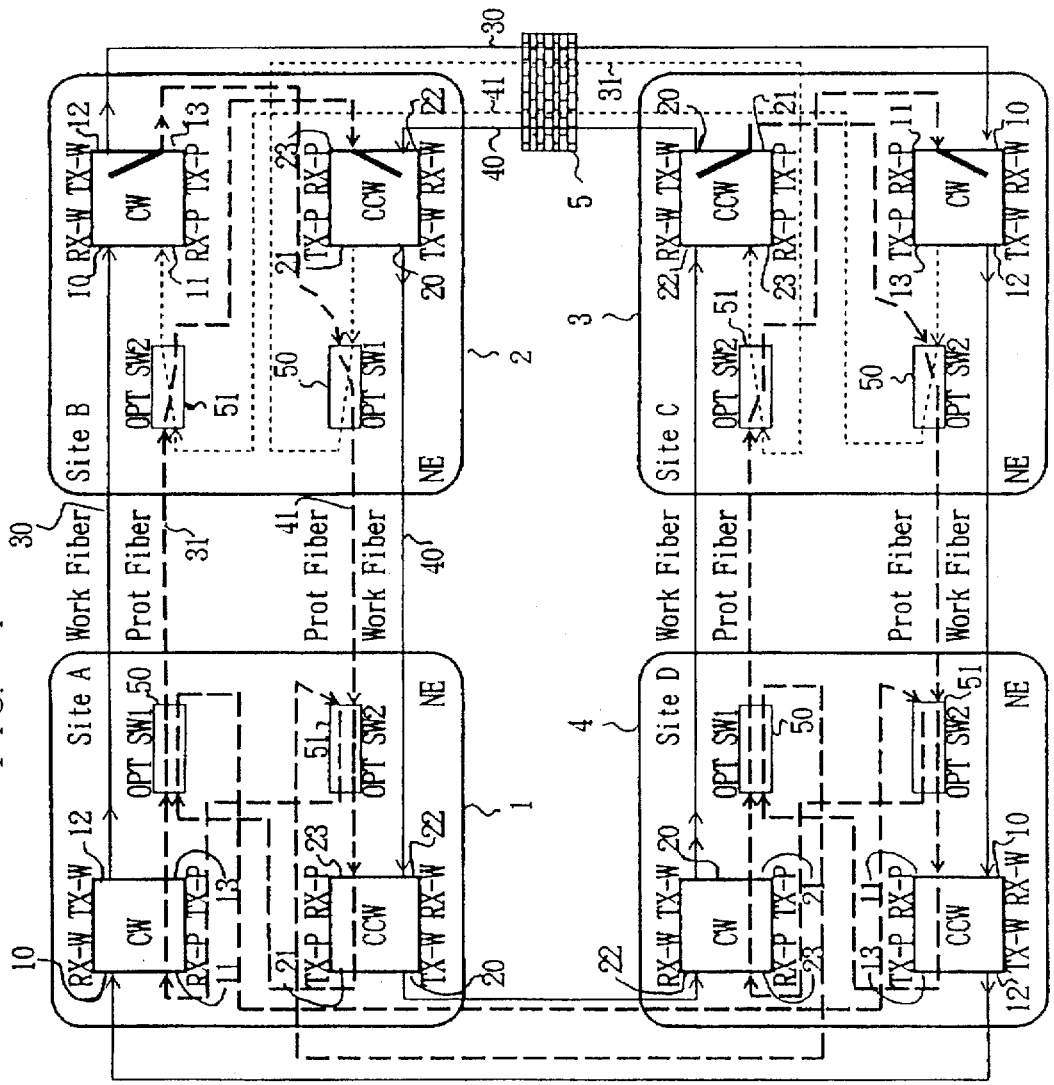
FIG. 4 is a block diagram of a four-site, line-switched ring using optical switches in a failed, active switched state.

FIGS. 3 and 4 explain the method of the present invention in more detail and show how the signals are switched and re-routed.

FIG. 3 shows a block diagram of a ring structure for performing the line-switching at the four nodal sites by utilizing optical switches. The ring system is in the normal, inactive state.

Shown is the same network in more detail, including the optical switches that are the key to the present invention. The same bi-directional paths have been set up in FIG. 3 as in FIG. 1 (shown with the bold lines).

In a normal state, the traffic is transmitted via only the working optical fibers 30 and 40. Accordingly, the optical switches 50 and 51 are not active, and not inserted in the traffic lines.

The optical switches having two input terminals and two output terminals are used as the optical switches 50 and 51. As example of this type of optical switch is a "SW 2:2", optical switch module produced by JDL FITEL LTD.

FIG. 4 is a block diagram of a four-site, line-switched ring using the optical switches in a failed, active switched state. In this diagram, the protection switching is active.

FIG. 4 is a diagram to explain switching in the case where the system is in the same failure mode as in FIG. 2. The case where the working and protection optical fibers are disconnected due to failure 5 is shown.

The traffic is bridged electrically at the nodal site B of the optical fiber network equipment (NE) 2, from the working transmitter TX-W of the clockwise optical transmitter 12, which transmits the clockwise signal, to the protection transmitter TX-P of the counter-clockwise optical transmitter 13, which now transmits the counter-clockwise signal.

This bridging could be accomplished optically but in this particular implementation, bridging traffic from working paths to protection paths is handled by an electrical, 1+1, span-switch.

The traffic then flows as shown through optical switch (OPTSW1) 50 of the optical fiber network equipment (NE) 2 at the site B which is now in an active state. That is, the traffic flows in the counter-clockwise (CCW) direction away from the failure 5 as explained above for FIG. 2.

The traffic travels around the ring in the counter-clockwise (CCW) direction, passing through the nodal sites A and D. At the nodal sites A and D, the traffic travels through the optical fiber network equipments (NE) and four inactive optical switches (OPTSW1) 50 from the counter-clockwise optical receiver 21 and (OPTSW2) 51, as shown with the broken line in the diagram, and finally reaches the nodal site C.

After arriving at the nodal site C, the traffic goes through activated optical switch (OPTSW 2) 51 of the optical fiber network equipment (NE) 3 and is delivered to the input of the clockwise optical receiver 11.

As at the site B, an electrical, 1+1, span-switch transfers the traffic from the clockwise (CW) protection optical receiver (RX-P) 11 to the working optical transmitter (RX-W) 10, restoring network services by looping away from the failed fibers.

The same sequence happens in a reverse direction to complete the bi-directional traffic path from the site C to site B, as shown in FIG. 4. As shown, both optical switches (OPTSW1, OPTSW2) 50 and 51 are active or driven at the each of the nodal sites adjacent to the failed fiber, that is, the nodal sites B and C.

The same method can be used in cases of failures between any of the nodal sites and for traffic between any of the nodal sites. Also, the switching method according to the present invention protects the remaining traffic by driving the optical switches (OPTSW1, 2) 50 and 51 if a node-loss occurs.

For example, if the nodal site B is lost, the nodal sites A and C will continue to communicate by looping back, away from the nodal site B. Of course any traffic to/from nodal site B will be lost due to the failure of the nodal site B.

The optical switches (OPTSW1, OPTSW2) 50 and 51 could be implemented in other ways to provide various switching paths according to the present invention.

For example, a simpler 1:2 optical switch could be utilized instead of the 2:2 crossover optical switch as shown in FIGS. 3 and 4.

The reason for using the 2:2 optical switch is to connect the failed protection fiber's input and output to the protection transmitter TX and receive RX of each of the fiber optical network equipments (NE) for monitoring purposes.

This allows the system to automatically return to the normal state once the fibers have been repaired by monitoring the fibers and after all repairs are made, the system is able to switch back to the inactive, normal state.

Figure 5:
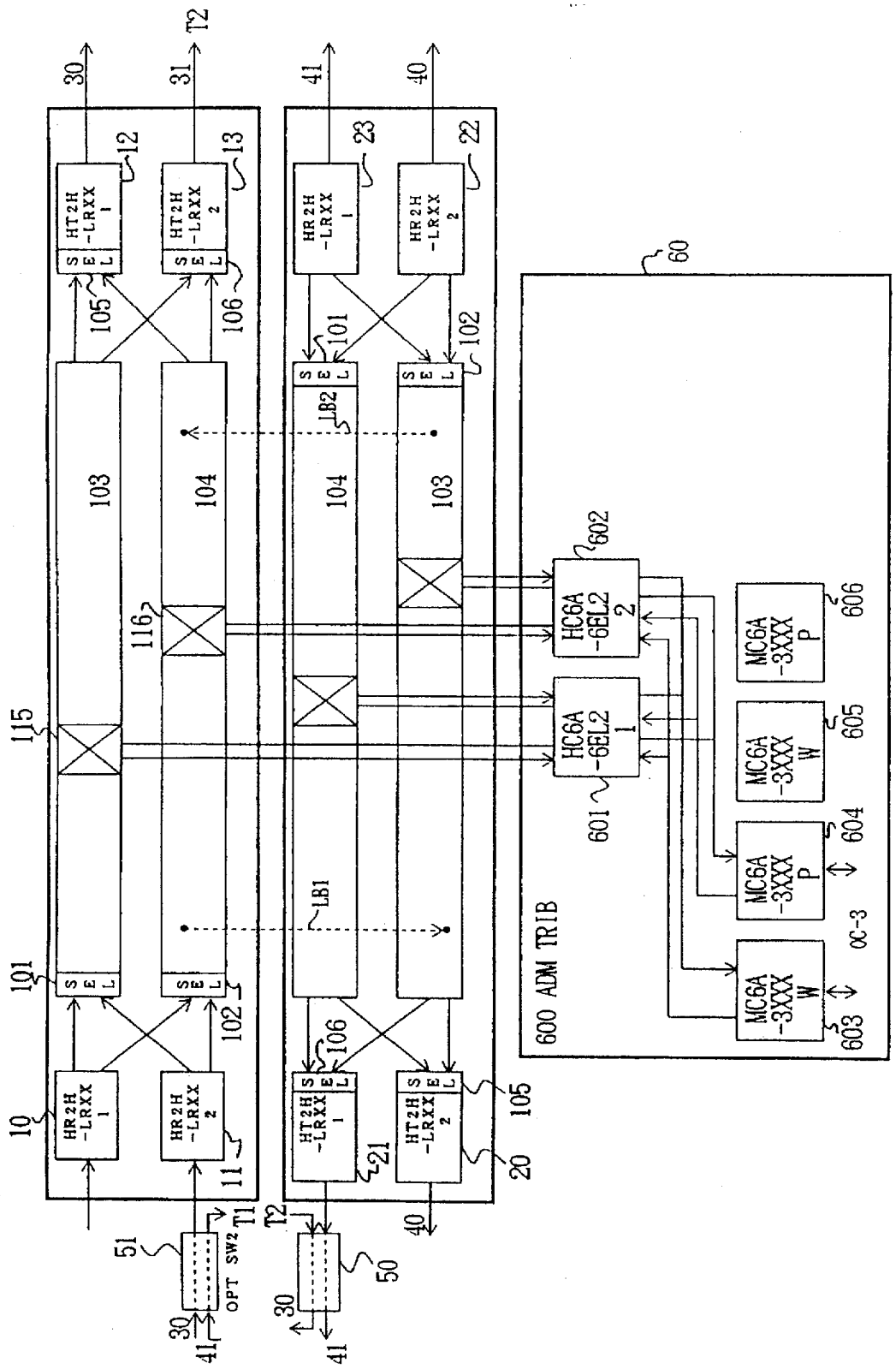
FIG. 5 is a diagram for explaining basic structure of fiber optical network equipment (NE)

FIG. 5 is a diagram showing a basic structure of the optical receivers and optical transmitters provided in the optical fiber network equipments (NE) 1 to 4 shown in FIGS. 1 through 4.

In the diagram, as explained above, optical receivers/optical transmitters are provided for the clockwise traffic, and optical receivers/optical transmitters are provided for the counter-clockwise traffic.

Further, two optical signals are input and two optical signals are similarly output to/from each of the optical receivers/optical transmitters. One optical signal is input to a high speed optical interface 10, and another optical signal is inputted to a high speed optical interface 11 via an external optical switch (OP SW2) 51.

Each of the high speed optical interfaces 10 and 11 converts an optical input signal to an electrical input signal and inputs it to a time slot assignment units (TSAU) 103 and 104.

The time slot assignment units (TSAU) 103 and 104 have selectors 101 and 102, respectively. Each of the selectors has the function of selecting either one of the electrical input signals from the high speed optical interfaces 10 and 11 by switching the signals.

When time slot assignment units (TSAU) 103 and 104 are on the working side, the selectors 101 and 102 select the signal from the high speed optical interface 10.

Further, the time slot assignment units (TSAU) 103 and 104 have cross-connectors 115 and 116. The cross-connectors 115 and 116 branch and input the input signal to a tributary unit 60, or add a signal from the tributary unit 60 to the input signal and then output the added signal.

The output signals from the time slot assignment units (TSAU) 103 and 104 are transmitted to the high speed optical interfaces 12 and 13. Each of the high speed optical interfaces 12 and 13 has the function of converting the inputted signals to optical signals and of outputting the optical signals.

Further, the high speed optical interfaces 12 and 13 include selectors 105 and 106, respectively.

The selectors 105 and 106 select the output from the time slot assignment unit (TSAU) 103 to the high speed optical interfaces 12 and 13, when the time slot assignment unit (TSAU) 103 is the active unit in the normal state.

Further, the selectors 105 and 106 switch to the input from the time slot assignment unit (TSAU) 104 to the high speed optical interfaces 12 and 13, when the time slot assignment unit (TSAU) 104 is the active unit.

The high speed optical interface 12 converts the input signal to an optical signal and transmits it to the clockwise working optical fiber 30.

Meanwhile, in the failure mode, the output from either the time slot assignment unit (TSAU) 103 or the time slot assignment unit (TSAU) 104, i.e., active unit, is input to the high speed optical interface 13.

The output from the high speed optical interface 13 is input to one input terminal of the external optical switch (OPTSW1) 50 via the protection optical fiber 31.

Further, the operation shown in FIG. 5 will be explained with reference to the optical fiber network equipment (NE) 2 at the site B shown in FIG. 4. In the case where failure 5 occurs, the signal output from the time slot assignment unit (TSAU) 103 of the NE, which transmits in the clockwise signal is switched to the input of the high speed optical interface 13 by the selector 106.

Then, the high speed optical interface 13 converts the signal to the optical signal and inputs the converted signal to one input terminal of the optical switch 50 connected to the protection optical fiber 31. Further, the optical switch 50 is switched by a control signal described later. Therefore, the output of the high speed optical interface 13 is looped back to the counter-clockwise protection fiber 41.

Meanwhile, as shown in FIG. 5, the tributary unit 60 comprises third-order group signal convertors 601 and 602 and second-order group signal convertors 603 to 606.

The second-order group signal convertors 603 and 604 are for working and protection, respectively, and the second-order group signal convertors 605 and 606 are similarly for working and protection, respectively. Connections of the second-order group signal convertors 605 and 606 with the third-order group signal convertors 601 and 602 have been abbreviated in the diagram.

The third-order group signal converters 601 and 602 and the second-order group signal convertors 603 to 606 are multiplexing/demultiplexing circuits, substantially. More particularly, the third-order group signal convertors 601 and 602 convert third-order group signals dropped from the cross-connectors 115 and 116 to second order group signals and provide the converted signals to the second-order group signal convertors 603 and 604, and in the reverse direction convert second-order group signals from the second-order group convertors 603 and 604 to third-order group signals and the converted signals are added with the signals input via the selectors 103 and 104 from the receivers to the cross-connectors 115 and 116.

Similarly, the second-order group convertors 603 and 604 convert the second-order group signal from the third-order group signal convertors 601 and 602 to the first-order group signal (OC-3), or reversely convert the first-order group signal to the second-order group signal and inputs it to the third-order group signal convertors 601 and 602.

In FIG. 5, broken lines LB1 and LB2 connecting the time slot assignment unit (TSAU) 104 with the time slot assignment unit (TSAU) 104 are shown for a comparison with a conventional systems of prior art.

In the conventional system, as shown with the broken lines LB1 and LB2, looping back is performed by an electrical signal when a failure occurs. However, it is difficult to switch the electrical signal by looping back at high speed.

Accordingly, the switching is performed by an optical switch and an optical signal is looped back according to the present invention.

Figure 6:
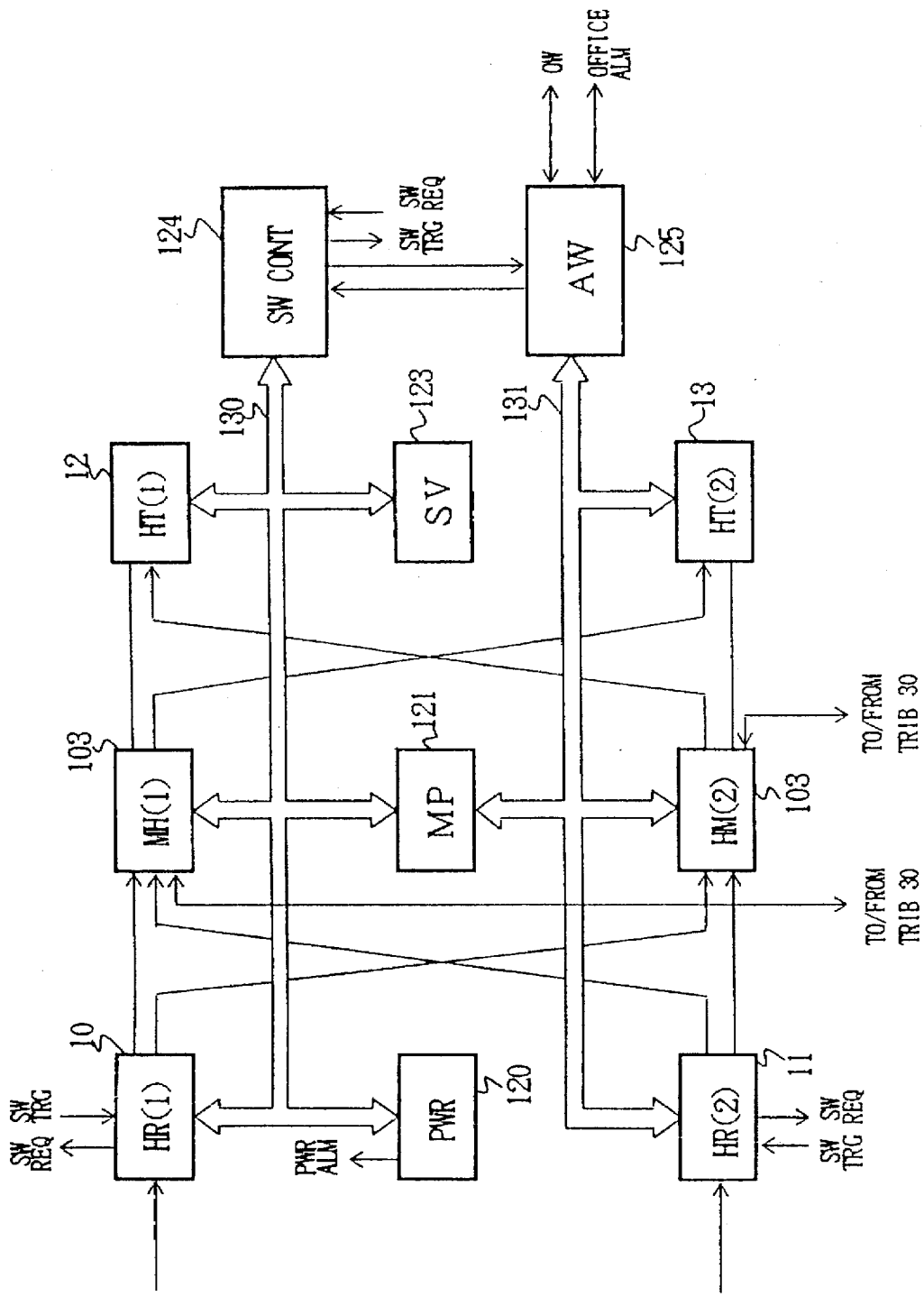
FIG. 6 is a diagram for explaining details of optical receivers and optical transmitters used in fiber optical network equipment (NE)

FIG. 6 is a diagram illustrating the relation of connections of the NE shown in FIG. 5. Same reference numerals are used in FIG. 6 to denote corresponding components as in FIG. 5.

In FIG. 6, a power circuit (PWR) 120, a microprocessor interface 121, a supervising circuit (SV) 123, a switch control unit 124 and an auxiliary circuit (AW) 125 are added to the structure of FIG. 5.

Buses 130 and 131 connect between components to form the NE. Power required to each element is supplied from the power circuit (PWR) 120. Further, a power alarm signal (PWR ALM) is outputted, when failure occurs in the power circuit (PWR) 120.

The microprocessor interface 121 controls with a micro computer, interfacing such as a clock synchronization, between the working side and the protection side.

The switch controller 124 is an element of the present invention, which collects alarm information from each element of the system, generates a switch trigger signal (SW TRG) for controlling the switching between the optical switch and the working and protection interface circuits.

The switch controller 124 comprises, for example, hardware switching control equipment and ROM which stores software for controlling a CPU which then controls the switching of the optical switches 50 and 51.

When predetermined alarm signals are received from the high speed optical interface circuits 10 or 11, the CPU executes software for controlling the switching by controlling the above-described switching hardware, and generates a trigger signal (SW TRG) for controlling the switching of the optical switches 50 and 51.

An auxiliary circuit (AW) 125 receives and sends order wire signals (OW) and further receives an alarm signal from station status, and sends it out.

FIG. 7 is a block diagram for functionally explaining the alarm processing in the optical receiver/optical transmitter. More particular, the diagram explains the control of the selectors 105 and 106 shown in FIG. 5.

In FIG. 7, same reference numerals are also used to corresponding components as in FIG. 5.

Only the working circuit is shown in the diagram for the sake of simplicity. Furthermore, the inside of the counter-clockwise blocks 10, 103, and 12 are not shown. However, they are the same as the clockwise blocks 10, 103 and 12 shown in FIG. 7.

In FIG. 7, reference numeral 70 shows the flow of the main signal. The main signal 70 is output via the optical interface circuit 10, the time slot assignment unit (TSAU) 103 and the high speed optical interface circuit 12 from the East side to the West side.

In the time slot assignment unit (TSAU) 103, ① ③ denote a DROP of the main signal 70 to the tributary circuit 60, not shown in FIG. 7, and an ADD of the signal from the tributary circuit 60.

In the example, an alarm generator 111 is provided in the high speed optical interface circuit 10 having a receiving function. The alarm generator 111 judges failure by detecting failure or drops of signal, frame and the like, and inputs an alarm signal (HRALM) to the alarm processing unit 115 of the time slot assignment unit (TSAU) 103. The judgment of failure in the alarm generator 111 can be performed according to a conventional method, which has already been used in Synchronous Optical NETwork (SONET) in U.S.A., described above.

The alarm processing unit 115 of the time slot assignment unit (TSAU) 103 sends the alarm signal to the tributary circuit 60 (FIG. 7, ②: HSALM) and a path alarm indication signal generator (PAIS. GEN) 125.

The path alarm indication signal generator 125 sends a path alarm indication signal to the path of a main signal to inform the failure to equipment provided downstream, when the alarm signal from the alarm processing unit 115, indicates particularly, the failure or drop of the main signal.

The time slot assignment unit (TSAU) 103 further has a tributary alarm processing circuit 135. The tributary alarm processing circuit 135 receives an alarm signal from the tributary circuit 60 and sends a selector switching control signal (SWTRIG) to the high speed optical interface circuit 12 having a transmitting function as well as the counter-clockwise high speed optical interface circuit 20.

The high speed optical interface circuit 12 controls the selector 105 to switch on the basis of the selector switching control signal (SWTRIG) sent from the tributary alarm processing circuit 135 of the time slot assignment unit (TSAU) 103.

Further, the high speed optical interface circuit 12 has a path alarm indication signal generator 117 and a clock disconnection detector 127. When clock disconnection is detected in the clock disconnection detector 127, the circuit 12 informs of the clock disconnection to the path alarm indication signal generator 117 to send the path alarm indication signal to the path of the main signal downstream.

As explained with reference to the preferred embodiments according to the present invention, an optical signal can be sent via a protection path switched over in a reversed direction, when a path of the optical signal is disconnected.

Therefore, the switching of the path is not performed by any form of an electrical signal, so that it is possible to easily cope with the failure of the path of the optical signal, even in the case of an optical fiber transmission system of, for example, 2.4 giga-bits.

The drawings are prepared for explanation of the present invention, and the present invention is not restricted to the embodiments disclosed in drawings. All structures are within the protective scope of the present invention, as far as a transmission signal is optically switched to be sent out to a counter direction to maintain the traffic in the case of failure.

It should be, of course, understood that equivalents having the same technical concept as that of the present invention are within the protective scope of the invention.

What is claimed is:

1. An optical fiber transmission system utilizing a line switched ring configuration for providing protection to the system in case of failure, the system comprising:

a first optical fiber transmission path having a first working optical fiber line and a first protection optical fiber line for transmitting an optical signal in a clockwise direction;

a second optical fiber transmission path having a second working optical fiber line and a second protection optical fiber line for transmitting an optical signal in a counterclockwise direction; and a plurality of transmission nodes interconnected by the first and second optical transmission paths in a ring configuration, each node including:

a first receiving and sending unit for receiving and sending an optical signal transmitted through said first optical fiber transmission path in the clockwise direction, a second receiving and sending unit for receiving and sending an optical signal transmitted through said second optical fiber transmission path in the counterclockwise direction, a first optical switch for receiving and passing optical signals transmitted through the first and second protection optical fiber lines to the first and second receiving and sending units, respectively, and a second optical switch for receiving and passing optical signals output from the first and second receiving and sending units to the first and second protection optical fiber lines, respectively.

2. The optical fiber transmission system according to claim 1, wherein said first and second optical switches respectively have two inputs and two outputs.

3. The optical fiber transmission system according to claim 2, wherein at a node within the system where a failure occurred, said first and second optical switches are controlled to cross-connect said two inputs and two outputs, said first and second receiving and sending units loop optical signals transmitted through the first and second working optical fiber lines back to the first and second protection optical fiber lines, and optical signals transmitted through the first and second protection optical fiber lines back to the first and second working optical fiber lines.

4. The optical fiber transmission system according to claim 3, wherein said first and second receiving and sending units respectively include first and second receiving and sending circuits, and selectors respectively provided at input and output sides of said first and second receiving and sending circuits.

5. The optical fiber transmission system according to claim 4, wherein said selectors cross-connect optical signals input from the working and protection optical fiber lines to said first and second receiving and sending circuits, and cross-connect optical signals output from the first and second receiving and sending circuits to the working and protection optical fiber lines, so that said first and second receiving and sending units may perform looping-back of optical signals.

* * * * *